US007240824B2

(12) United States Patent
Stockton

(10) Patent No.: US 7,240,824 B2
(45) Date of Patent: *Jul. 10, 2007

(54) USING RADIO FREQUENCY IDENTIFICATION WITH CUSTOMER LOYALTY CARDS TO DETECT AND/OR PREVENT THEFT AND SHOPLIFTING

(75) Inventor: Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 10/666,483

(22) Filed: Sep. 19, 2003

(65) Prior Publication Data

US 2005/0061870 A1   Mar. 24, 2005

(51) Int. Cl.
*G06F 17/00* (2006.01)
(52) U.S. Cl. ........................ 235/375; 235/376
(58) Field of Classification Search ................ 235/375, 235/376, 383, 384, 385, 462.46, 472.02; 340/539.13, 572.1–572.4; 705/16, 28, 64, 705/72
See application file for complete search history.

(56) References Cited

U.S. PATENT DOCUMENTS

| | | | |
|---|---|---|---|
| 3,878,365 | A | 4/1975 | Schwartz |
| 4,676,343 | A | 6/1987 | Humble et al. |
| 5,397,882 | A | 3/1995 | Van Solt |
| 5,424,524 | A | 6/1995 | Ruppert et al. |
| 5,637,846 | A | 6/1997 | Boers et al. |
| 5,640,002 | A | 6/1997 | Ruppert et al. |
| 5,745,036 | A | 4/1998 | Clare |
| 5,874,896 | A | 2/1999 | Lowe et al. |
| 5,955,951 | A | 9/1999 | Wischerop et al. |
| 5,992,570 | A | 11/1999 | Walter et al. |
| 6,073,843 | A | 6/2000 | Goodwin et al. |
| 6,193,152 | B1 | 2/2001 | Fernando |
| 6,193,162 | B1 * | 2/2001 | Niwata et al. ............... 235/487 |
| 6,327,576 | B1 | 12/2001 | Ogasawara |
| 6,327,578 | B1 * | 12/2001 | Linehan ........................ 705/65 |
| 6,333,692 | B1 | 12/2001 | Andersen et al. |
| 6,382,357 | B1 | 5/2002 | Morrison et al. |
| 6,415,982 | B2 * | 7/2002 | Bridgelall et al. ...... 235/472.01 |
| 6,487,540 | B1 | 11/2002 | Smith et al. |
| 6,491,217 | B2 | 12/2002 | Catan |

(Continued)

OTHER PUBLICATIONS

"How Anti-shoplifting Devices Work", printed Aug. 27, 2003, <http://electronics.howstuffworks.com/anti-shoplifting-device.htm/printable> (p. 1-10).

(Continued)

*Primary Examiner*—Lisa Caputo
(74) *Attorney, Agent, or Firm*—Marcia L. Doubet; A. Bruce Clay

(57) ABSTRACT

Techniques are disclosed for detecting shoplifting or theft, particularly in a retail environment, using radio-frequency identification ("RFID"). Preferred embodiments leverage RFID tags on merchandise and RFID data that is written at the point of sale on the merchandise-borne RFID tags themselves, on the customer's receipt, or both. Some embodiments also leverage RFID tags on customer identification or "loyalty" cards. After writing RFID data on the merchandise-borne tags and/or receipt, a matching operation is performed at an RFID reader when the shopper and his merchandise exit the premises, in order to determine whether the shopper has paid for the items in his possession.

14 Claims, 11 Drawing Sheets

U.S. PATENT DOCUMENTS

| | | | |
|---|---|---|---|
| 6,507,279 | B2 | 1/2003 | Loof |
| 6,554,187 | B2 | 4/2003 | Otto |
| 6,609,656 | B1 | 8/2003 | Elledge |
| 6,672,506 | B2 | 1/2004 | Swartz et al. |
| 6,681,989 | B2 | 1/2004 | Bodin |
| 6,801,130 | B2 | 10/2004 | Campero |
| 6,883,710 | B2 * | 4/2005 | Chung ........................ 235/385 |
| 6,961,000 | B2 | 11/2005 | Chung |
| 7,012,528 | B2 * | 3/2006 | Mathewson et al. ..... 340/572.1 |
| 2002/0188561 | A1 | 12/2002 | Schultz |
| 2003/0089780 | A1 | 5/2003 | Goodyear et al. |
| 2003/0120607 | A1 | 6/2003 | Piotrowski |
| 2003/0216969 | A1 | 11/2003 | Bauer et al. |
| 2004/0016796 | A1 | 1/2004 | Hanna et al. |
| 2004/0148226 | A1 | 7/2004 | Shanahan |
| 2005/0001719 | A1 * | 1/2005 | Aupperle et al. ...... 340/539.13 |

OTHER PUBLICATIONS

Schmidt, Charlie, "Beyond the Bar Code" and companion article "What's My Number", *Technology Review Magazine*, Mar. 2001 (p. 80-85).

Webb, Warren, "Stop! Thief", *EDN*, Jun. 21, 2001 (p. 52, 54, 56).

Pope, Justin, "Radio-Tagged Codes to Hit Supply Lines", AP Business Writer, Printed Sep. 15, 2003.

* cited by examiner

USING RADIO FREQUENCY IDENTIFICATION WITH CUSTOMER LOYALTY CARDS TO DETECT AND/OR PREVENT THEFT AND SHOPLIFTING

RELATED INVENTIONS

The present invention is related to the following commonly-assigned applications, which were filed concurrently herewith and which are hereby incorporated herein by reference: U.S. Pat. No. 7,005,988 (Ser. No. 10/665,282, titled "Using Radio Frequency Identification to Detect and/or Prevent Theft and Shoplifting"; U.S. Pat. No. 7,012,528 (Ser. No. 10/666,703, titled "Using Radio Frequency Identification with Transaction-Specific Correlator Values Written on Transaction Receipts to Detect and/or Prevent Theft and Shoplifting"; U.S. patent Ser. No. 10/666,287, titled "Using Radio Frequency Identification with Transaction-Specific Correlator Values to Detect and/or Prevent Theft and Shoplifting"; and U.S. patent Ser. No. 10/666,700, titled "Using Radio Frequency Identification with Transaction Receipts to Detect and/or Prevent Theft and Shoplifting".

BACKGROUND OF THE INVENTION

1. Field of the Invention

The present invention relates to radio-frequency identification ("RFID") technology, and deals more particularly with techniques for leveraging RFID technology with customer loyalty cards to detect and/or prevent theft and shoplifting.

2. Description of the Related Art

Theft and shoplifting are problems in many environments. For retail businesses, for example, billions of dollars are lost every year to shoplifting. Several techniques exist to combat theft in the retail environment. As one example, some retailers station an employee at the store exit to visually verify that the merchandise in the customer's possession matches an itemized receipt that was issued at the point of sale. Of course, this approach is expensive for the retailer, and is often intimidating and humiliating for honest customers. Other approaches, also not cost-effective, include stationing employees to guard the merchandise, chaining high-value items to display shelves or placing them in locked display cases, and electronic surveillance ("EAS").

Many technologies have been employed for EAS. The basic principle behind most prior-art EAS systems includes using a transmitter to create an electromagnetic field across the store's exit area and a receiver than can detect variations in the field. Small tuned circuits or magnetic material inside security tags that pass through the exit modify the field enough for the receiver to detect the change and activate an alarm. The retailer attaches the tags to high-risk items, and the EAS notifies him or her when a tag passes through the exit field. The security tag must be removed or deactivated at the point of sale to prevent the alarm from sounding. See "Stop! Thief" by Warren Webb, *EDN*, Jun. 21, 2001, pp. 52, 54, 56, for a review of prior-art EAS systems.

Passive EAS systems in use today typically operate at 8.2 MHZ, 9.5 MHZ, and other frequencies. EAS tags for garments may be detached at the point of sale using a special tool. EAS tags on smaller items, also called disposable labels, are designed to remain on the item but must be deactivated (detuned) at the point of sale. This is done by passing the tagged item near a strong electromagnetic filed, which changes the tuning of the passive antenna in the tag by destroying a fusible link, thus modifying the return signal detected when the item passes near the receiver.

The tags used by these types of prior-art EAS systems are completely passive.

More recently, a new technology called Radio Frequency Identification ("RFID") has been introduced for labeling and tracking items of merchandise from manufacturing through distribution and retail sale. RFID differs from passive EAS technologies in several important ways. An RFID tag includes both passive elements (an antenna) and active elements (a read-write data memory, control circuitry, and a radio frequency transponder). RFID tags are typically not self-powered, but may receive their power via capacitative coupling from an external radio frequency source. When brought into proximity with an RFID reader at a typical effective distance of about 1 centimeter to 5 meters (depending on the type of tag), the RFID tag receives sufficient power to enable clocking the semiconductor and analog portions comprising the transponder, control circuits, and data memory through enough clock cycles that the tag can return the data bits from its memory as a digitally-encoded RF signal. This is advantageous because the tag can be read (or written) from a distance without the necessity of line-of-sight, as had been required to read a bar code with a laser scanner.

RFID technology has generally been utilized for inventory control (e.g., in a warehouse, manufacturing, or distribution facility) and for item identification at the point of sale as an improvement over today's nearly ubiquitous laser-scanned bar codes. Several large retailers have indicated a desire to begin using RFID tagging on all their merchandise. RFID tags can be created using relatively inexpensive manufacturing techniques: the antenna portion can be printed on packaging material with conductive carbon ink, and the semiconductor portion—as small as 3 millimeters square—can be mounted to the antenna with glue. The cost of RFID tags is expected to decline to the point of being cost-effective even on small-value retail items. Thus, it can be assumed that in the near future, RFID tags on merchandise will become nearly ubiquitous.

The use of RFID to deter theft has been suggested in several contexts. Notably, early RFID literature suggested that RFID could be used for improved inventory control, thereby preventing employees from stealing items from the store's inventory. The literature also suggested that RFID could prevent theft in the distribution chain between the manufacturer and retailer, by actively monitoring inventory in trucks and shipping containers to ensure that merchandise was not diverted to unintended destinations. Commonly-assigned, co-pending U.S. patent application Ser. No. 09/790,104 (filed on Feb. 21, 2001), entitled "Method to Address Security and Privacy Issues of the Use of RFID Systems to Track Consumer Products" (which is hereby incorporated herein by reference), discussed techniques for secure electronic labeling by overwriting RFID tags at the point of sale and by placing control bits into the RFID data memory, in order to prevent an unscrupulous store employee from reprogramming the RFID tag of an expensive item with data representing an inexpensive item, in order to pay a lower price for the expensive item.

The read-write data memory in today's RFID tags is non-volatile and typically has a capacity of 5 to 256 bytes. The antenna in RFID tags can be printed on a product's packaging using conductive ink, as noted above. Or, rather than placing the tag on the packaging, it may be incorporated into the product (for example, by sewing an RFID) tag into a garment, placing an RFID tag on a page within a book, and so forth). The memory typically stores an "Electronic Product Code" or "EPC", a counterpart of the bar code, that assigns a searchable number to each object. The EPC identifies a consumer product individually, not just by type. Present versions of the code use 96 bits of information, which comprises an 8-bit header, two sets of 24 bits that identify the manufacturer and the product type (respectively), and a 40-bit serial number. Ninety-six bits encode enough information to uniquely identify trillions of objects. See "Beyond the Bar Code" and companion article "What's My Number" by Charlie Schmidt, *Technology Review Magazine*, March 2001, pp. 80–85.

Prior art techniques are deficient in several respects. Having an employee inspect each shopper's merchandise is not only expensive for the employer and embarrassing for the shoppers, as noted above, it is also prone to human error. Existing passive EAS technology leaves room for a number of improvements and adaptations. RFID tagging of merchandise is coming into use in retail environments, but as presently utilized this technology does not avoid the need to also tag the articles with traditional EAS tags for theft detection, or to disable the RFID tag at the point of sale as is generally done with passive disposable EAS tags. It is desirable to continue utilizing the RFID tag as a data transponder, without destroying the tag or deleting its data memory, after an item containing the tag has been purchased at a point of sale. It is also desirable to determine, on the spot, whether an item has been paid for, even if a transaction database in which transactions are recorded is unavailable. The present invention avoids deficiencies of the prior art, while providing effective techniques for shoplifting and theft detection.

SUMMARY OF THE INVENTION

An object of the present invention is to provide improved techniques for shoplifting and theft detection.

Another object of the present invention is to provide techniques for detecting shoplifting using RFID technology with customer loyalty cards.

A further object of the present invention is to use RFID technology to reduce lost revenue caused by shoplifting.

Yet another object of the present invention is to enable detection of shoplifting even though a transaction database in which product purchases are recorded is (at least temporarily) unavailable.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention comprises techniques for preparing information usable in theft detection using RFID technology, comprising: reading a customer identifier from a customer loyalty card; and storing the customer identifier in an RFID tag affixed to each of one or more items presented for purchase in a current transaction. The customer identifier may be read from an RFID tag affixed to the customer loyalty card. The technique may further comprise concluding that at least some of one or more items possessed by a shopper were not paid for in the current transaction if the customer identifier is not present in an RFID tag affixed to each such item.

In another aspect, the present invention provides techniques for detecting potential theft, comprising: reading, from a customer loyalty card, a customer identifier; and concluding that at least some of one or more items possessed by a shopper were not paid for if the customer identifier is not present in an RFID tag affixed to each such item. The customer identifier may be read from an RFID tag affixed to the customer loyalty card. The customer identifier may be stored in the RFID tag affixed to each of one or more items, when the items were presented for purchase.

In yet another aspect, the present invention provides a customer loyalty card bearing identifying information about a customer, wherein the card is augmented with an RFID tag in which the identifying information is stored, thereby enabling the identifying information to be read from the card with an RFID reader device.

The present invention will now be described with reference to the following drawings, in which like reference numbers denote the same element throughout.

DESCRIPTION OF PREFERRED EMBODIMENTS

The present invention provides improved techniques for detecting shoplifting (referred to hereinafter equivalently as theft), particularly in a retail environment. Preferred embodiments leverage RFID tags on merchandise and RFID data that is written at the point of sale on the merchandise-borne RFID tags themselves, on the customer's receipt, or both. Some embodiments also leverage RFID tags on customer identification or "loyalty" cards. After writing RFID data on the merchandise-borne tags and/or receipt, a matching operation is performed at an RFID reader when the shopper and his merchandise exit the premises, in order to determine whether the shopper has paid for the items in his possession.

RFID tags are expected to become nearly ubiquitous, as stated earlier. In many cases, an RFID tag bears an EPC that uniquely identifies a product (including product type, serial number, etc.), as described earlier. Alternatively, an RFID tag of the prior art may bear an item SKU ("stock-keeping unit") and a unique item serial number. An SKU is an identifier used for categorizing products, for example by item type. The serial number may be globally unique, or unique within the SKU number. A combination of SKU and serial number may therefore be used to uniquely identify a particular item of that particular type. When using either an EPC or an SKU with serial number, this information is stored in the small memory area on the RFID tag. When power is supplied to the RFID tag's antenna from an RFID reader, as described above, the information stored in the memory area can be read and transmitted. Several preferred embodiments of the present invention write additional information into this memory area, as will be described.

Figure 1:
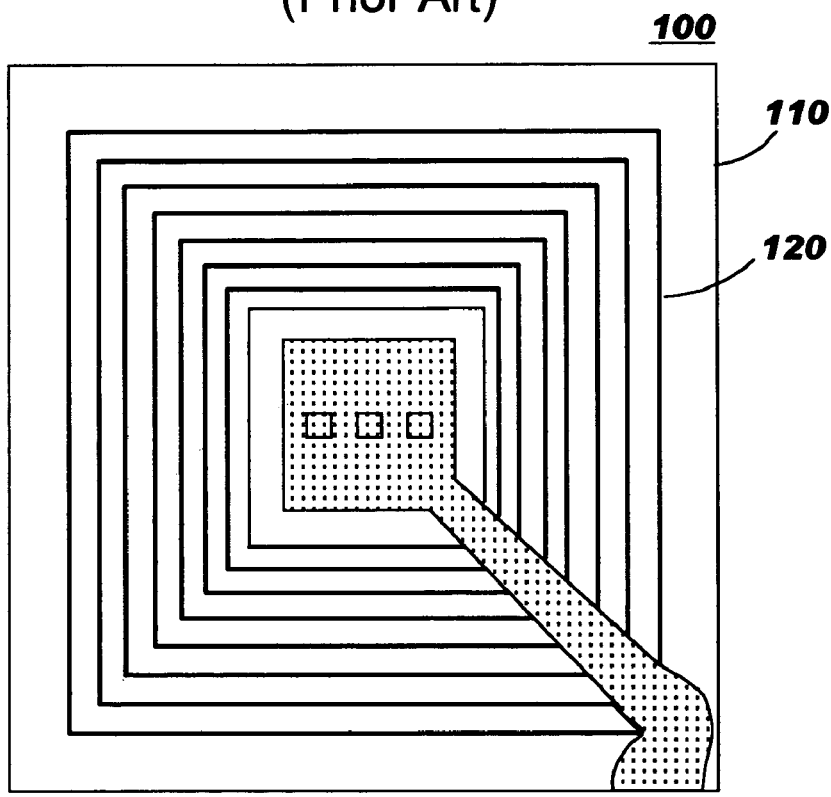
FIG. 1 illustrates a representative RFID tag, according to the prior art.
Figure 2:
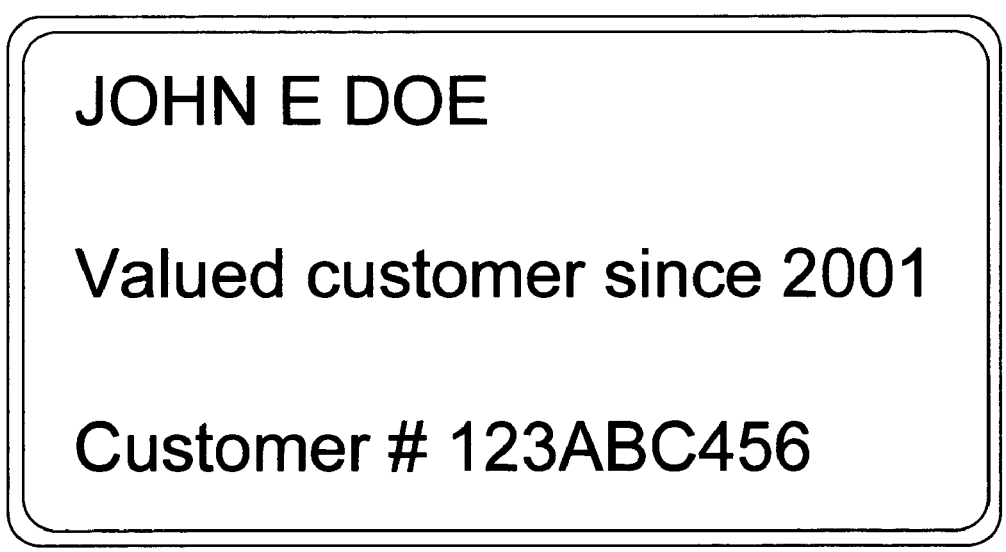
FIG. 2 illustrates a customer loyalty card, according to the prior art.

A representative RFID tag 100 of the prior art is illustrated in FIG. 1, showing a coiled antenna 120 (which in this example takes on a generally square shape) embedded on some type of substrate 110. Customer loyalty cards are used in several embodiments of the present invention, and the physical appearance of a representative loyalty card of the prior art is shown in FIG. 2. Loyalty cards of the prior art store a customer ID in a machine-readable magnetic strip which is typically scanned at the point of sale, and are used by many different types of stores to track information such as customer buying habits. Some embodiments of the present invention attach an RFID tag to a customer loyalty card so the customer ID data can be read from the card via an RFID reader.

In each preferred embodiment of the present invention, operations are initially performed at the point of sale to identify the items selected by the shopper for purchase. Additional operations are then performed as each shopper exits the store, where these later operations are directed toward verifying information provided by the operations that were performed at the point of sale.

In a first preferred embodiment, a checksum is used in detecting potential theft. Components leveraged by this embodiment are shown generally in FIGS. 3A and 3B, and flowcharts depicting logic that may be used in an implementation of this embodiment are shown in FIGS. 4A and 4B.

Figure 3A:
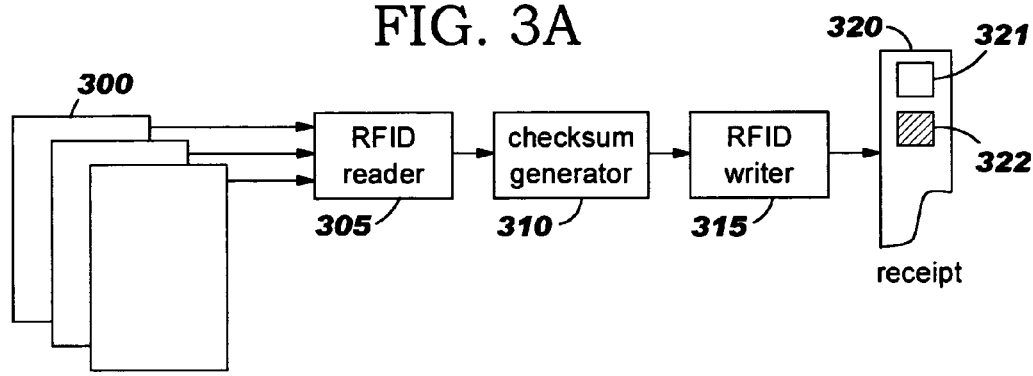
FIGS. 3A and 3B, 5A and 5B, 7A and 7B, 9A and 9B, and 11A and 11B illustrate components involved in several preferred embodiments of the present invention.
Figure 4A:
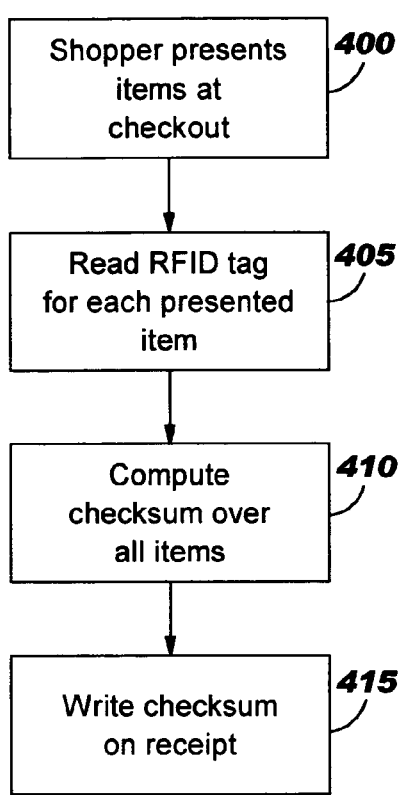
FIGS. 4A and 4B, 6A and 6B, 8A and 8B, 10A and 10B, and 12A and 12B provide flowcharts illustrating logic that may be used when implementing several preferred embodiments of the present invention.
Figure 4B:
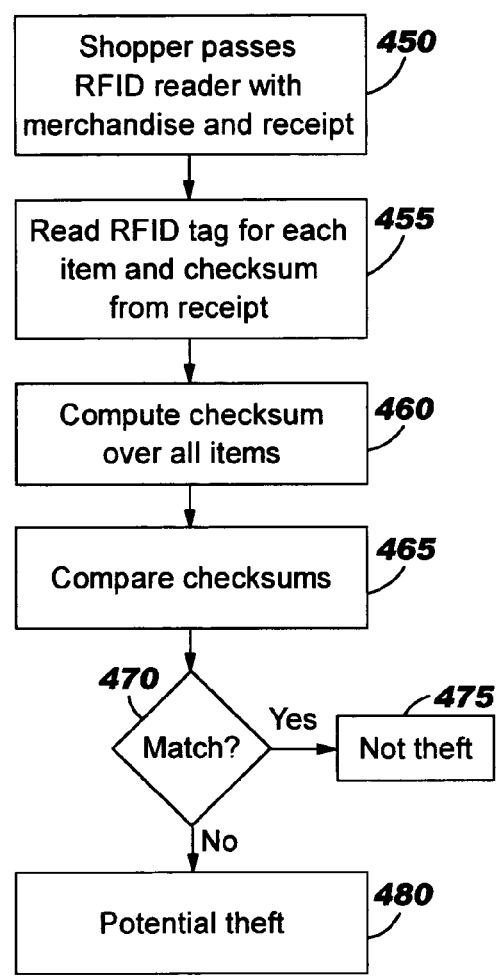

A shopper selects some number of items, represented by element 300 in FIG. 3A, and presents these items for checkout at a point of sale (Block 400 of FIG. 4A). At the point of sale, an RFID reader 305 reads an RFID-readable identifier borne on each item presented for purchase (Block 405). A checksum generation component 310 (which may be embodied within the RFID reader) generates a checksum of data from the RFID-readable identifiers (Block 410). The data used in generating the checksum may comprise the item's EPC, its SKU, its unique item serial number, some combination thereof, or any other data or data combination from the RFID tag, provided that the data used for each particular item serves to identify that item. (Any suitable checksum algorithm may be used without deviating from the inventive concepts of the present invention.)

Next, the generated checksum is written (Block 415) by an RFID writer component 315 (which may be embodied within the RFID reader and/or checksum generator components 305, 310) onto a sales receipt 320 in an RFID-readable form. Preferably, the checksum is written on the receipt using a passive RFID print-on-demand technology. As an example of this print-on-demand approach, an antenna and memory chip may be applied to the receipt at the point of sale. Alternatively, a pre-manufactured RFID receipt card may be customized at the point of sale by writing data into its memory. (For ease of reference, discussions hereinafter of writing to a "receipt" are in terms of using a printed sales receipt rather than a receipt card or other form of receipt, although this is for purposes of illustration and not of limitation.) A preferred manner of locating this RFID-readable checksum on the sales receipt 320 is to position the checksum as shown at element 322, beneath the conventional printout 321 that lists the individual items and pricing information. Alternatively, the RFID-readable checksum may be placed at another location on the receipt.

It is expected that a print-on-demand capability for RFID tags will be relatively inexpensive in the near future. In the general case, "print-on-demand" capability refers to applying an RFID tag to an item at some time following an item's manufacture. In another aspect, the memory component is applied to an item during the manufacturing process, and the antenna is subsequently applied using print-on-demand technology. In an aspect leveraged by this first preferred embodiment, the entire RFID tag is printed on demand on a sales receipt that has been printed or otherwise generated at the point of sale and the computed checksum is written into this tag's data memory.

Figure 3B:
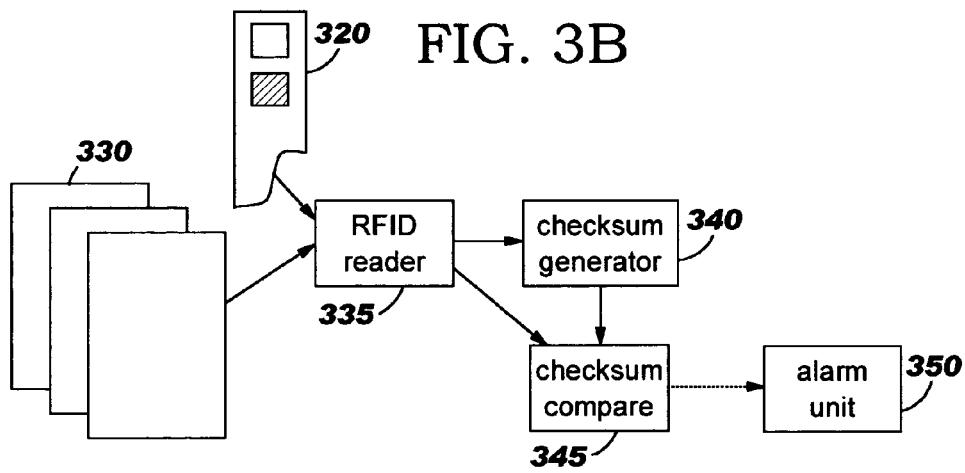

Referring now to FIGS. 3B and 4B, as the shopper exits the premises carrying merchandise 330 and sales receipt 320, he passes an RFID reader 335 (Block 450) which non-intrusively reads the RFID-readable identifiers on the exiting merchandise and the checksum on the receipt (Block 455). A checksum generator component 340, which performs the same computations as checksum generator component 310 of FIG. 3A (and which may be embodied within the RFID reader 335), then computes the checksum anew (Block 460) over the data read by RFID reader 335 from the shopper's items 330. A checksum comparison component 345 then compares the two checksums (Block 465) to determine whether they match (Block 470). If the items 330 in the shopper's possession at checkout are the same items 300 that were presented and purchased at the point of sale, then the checksums will be identical, and the test in Block 470 will have a positive result, indicating that there is no theft (Block 475).

Otherwise, when the checksums do not match, this is a potential theft situation (Block 480). The shopper may be concealing items that were detected by the RFID reader 335, but which were not presented at the point of sale and are therefore not reflected in the checksum 322 on the receipt. Or, the shopper may have substituted a more expensive item, or several of the same item, in place of one paid for. Conventional means are preferably used to deal with this potential theft, such as triggering an alarm unit 350, notifying store personnel, and/or stopping the shopper and the merchandise from exiting the premises.

Figure 5A:
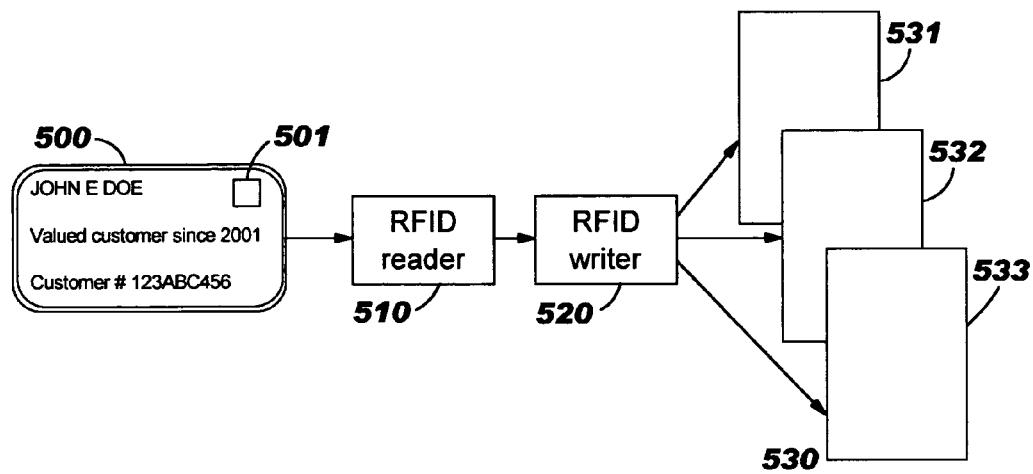

In a second preferred embodiment, a customer loyalty card is used in detecting potential theft. According to this embodiment, the loyalty card is augmented to include an RFID tag or component, where the tag's memory stores a unique customer number (or, equivalently, other information that uniquely identifies this particular customer) that can be read with an RFID reader. (Note that while discussions herein refer primarily to using RFID "tags", this is not meant to limit the present invention to use with a particular physical form of RFID implementation. RFID tags may be more generally referred to as transponders. An RFID tag may be embedded into an item, and it is therefore not necessary that the physical embodiment of the RFID components resemble a tag.) Components used in this second preferred embodiment are shown generally in FIGS. 5A and 5B, and flowcharts depicting logic that may be used in an implementation of this embodiment are shown in FIGS. 6A and 6B.

Figure 6A:
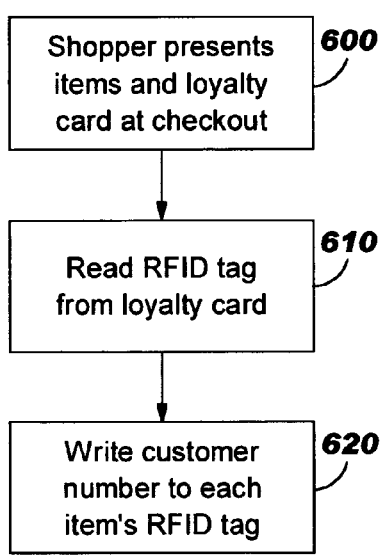

In this second preferred embodiment, a shopper presents his loyalty card 500, containing the RFID tag 501, along with his selected items 530 at the point of sale (Block 600 of FIG. 6A). An RFID reader 510 reads the customer number from the loyalty card (Block 610). An RFID writer 520 (which may be embodied within the RFID reader) then writes this customer number (Block 620) to the RFID tag of each item 531, 532, 533 purchased.

Figure 5B:
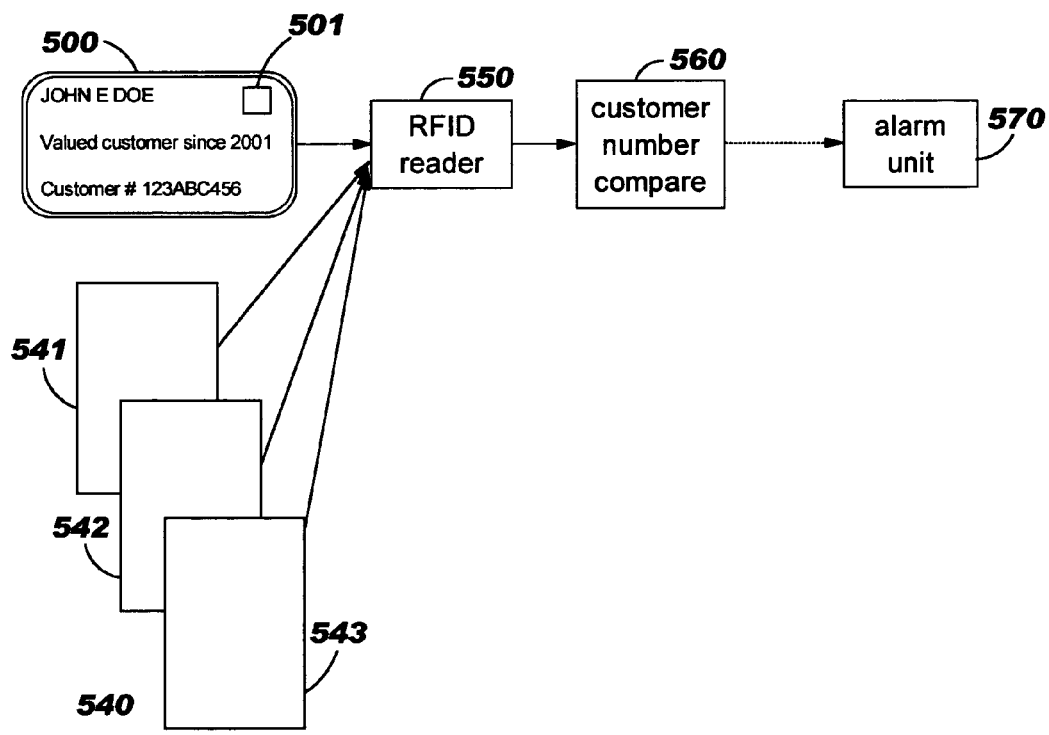
Figure 6B:
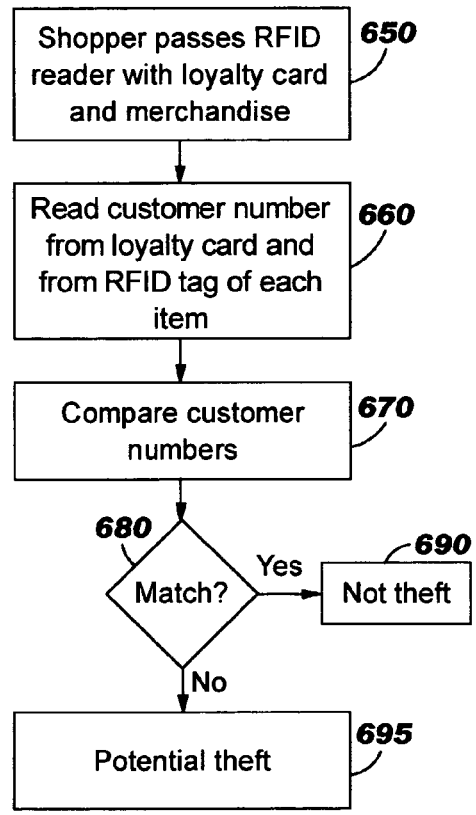

Referring now to FIGS. 5B and 6B, as the shopper exits the premises with his loyalty card 500 and merchandise 540, he passes an RFID reader 550 (Block 650) which non-intrusively reads the RFID tag from the loyalty card and the RFID tag from each item (Block 660). A customer number comparison component 560 (which may be embodied within the RFID reader 550) compares the customer number from each item (Block 670) with the customer number from the loyalty card to determine whether they match (Block 680). If the numbers do not match on any of the comparisons (Block 695), then this is a potential theft situation, and conventional means may be used as described above (such as triggering an alarm unit 570). Otherwise, if the customer number matches on each comparison (Block 690), then this is a not a theft situation.

Figure 7A:
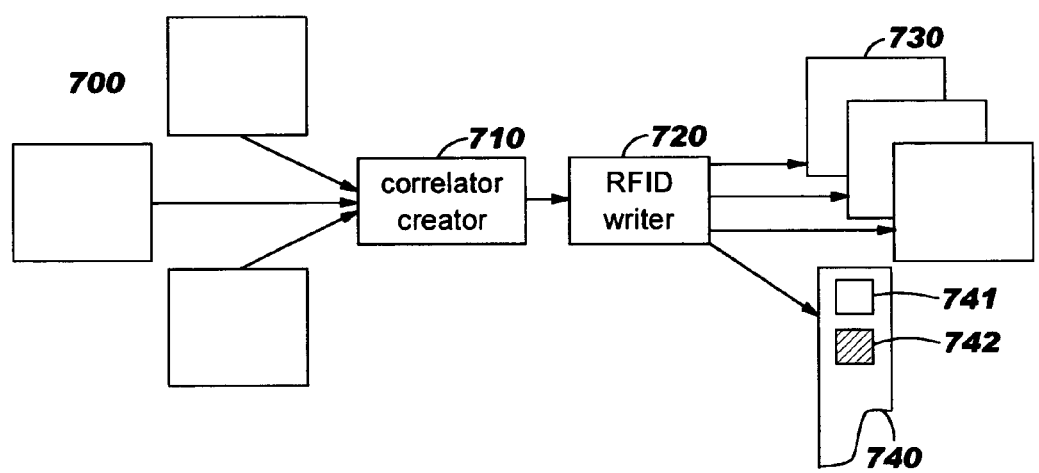
Figure 7B:
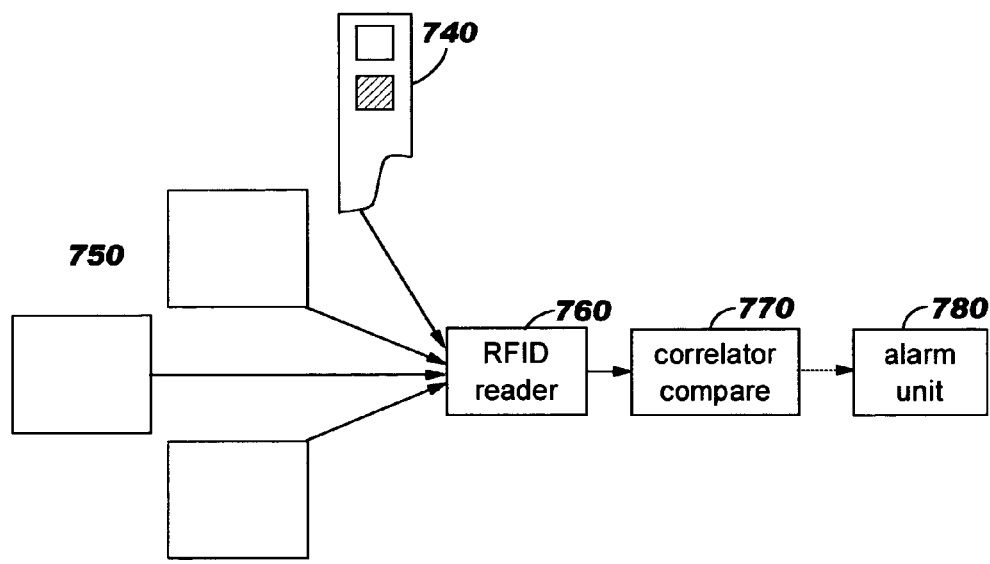
Figure 8A:
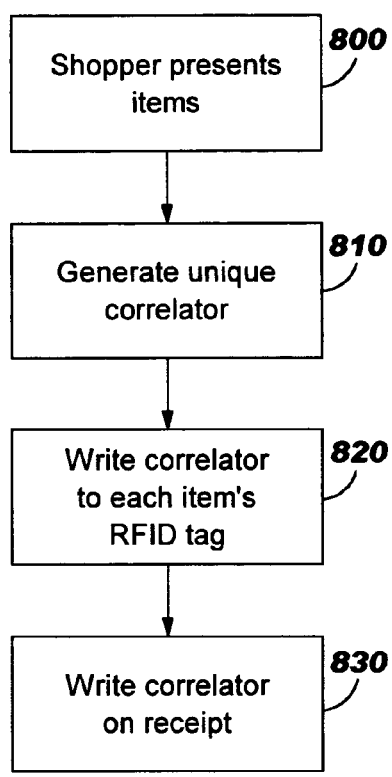
Figure 8B:
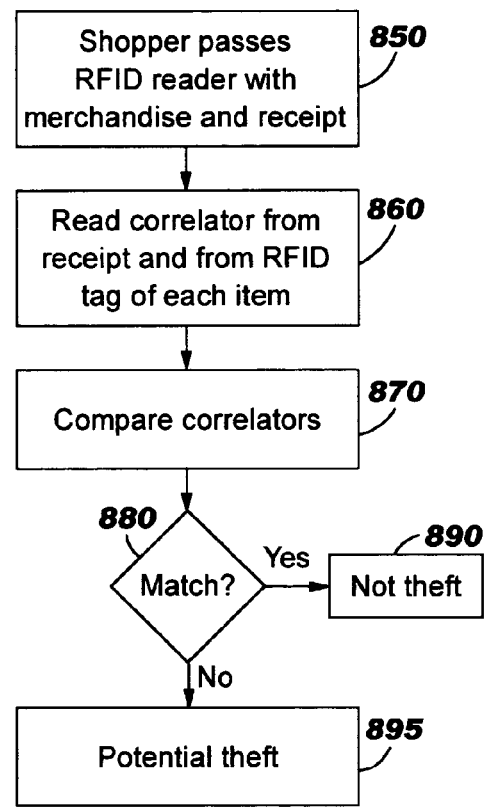

In a third preferred embodiment, illustrated in FIGS. 7A and 7B (showing components) and FIGS. 8A and 8B (depicting flowcharts), a unique correlator is used in detecting potential theft. The correlator is created for each sales transaction, using any suitable data for generating a unique value. Examples of data that may be used in this process are shown generally at 700 of FIG. 7A, and include the current date and time, the register number of a cash register or other point-of-sale device, a transaction identifier, a customer number concatenated with a counter that is incremented specifically for this customer, and so forth. As another example, the correlator might be formed simply by using a counter which is initialized to a particular value upon first use and is then incremented for subsequent purchases. The correlator creating component is shown at 710, and may be embodied in the point-of-sale device (or in the RFID writer 720).

When the shopper presents his items 730 for purchase (Block 800), the correlator is generated (Block 810) and written (Block 820) by the RFID writer 720 into the RFID tag of each purchased item 730. The same correlator is also written (Block 830) onto the sales receipt 740, preferably using RFID print-on-demand technology as discussed earlier. In this embodiment, the sales receipt 740 preferably includes conventional information 741, such as an itemized list of purchases, and the RFID-readable correlator appears in a separate location 742 (such as following the conventional information 741).

Referring now to FIGS. 7B and 8B, as the shopper exits the premises carrying merchandise 750 and sales receipt 740, he passes an RFID reader 760 (Block 850) which non-intrusively reads the correlators from the RFID tags of the exiting merchandise and the sales receipt (Block 860). At Block 870, a comparison is performed by a correlator comparison component 770 (which may be embodied within the RFID reader 760), comparing each individual item's correlator to the correlator read from the sales receipt. Block 880 tests whether these correlators match. If so, then this is not a theft situation (Block 890). Otherwise, when the correlators do not match (including the case where the shopper possesses items having no correlator), this is a potential theft situation (Block 895). Conventional means are preferably used to deal with this potential theft, such as triggering an alarm unit 780 and so forth.

In an optional aspect of this third preferred embodiment, instead of (or in addition to) writing the correlator on the receipt using RFID technology, the correlator may be written in another manner. For example, a textual representation of the correlator may be printed on the receipt, or a machine-readable representation (such as a barcode version or an optical character recognition, or "OCR", version) might be used. In this aspect, when the shopper is exiting the premises, a human or a different automated component performs the reading of sales receipt 740 and the comparison of its correlator to the correlators read from the items in the shopper's possession.

It may happen that a shopper buys items from more than one merchant, and therefore has some items in his possession that have RFID tags matching the correlator on the sales receipt as well as other items that do not have this correlator. Or, the shopper may have items in his possession that were purchased from this merchant at an earlier time. Such items will therefore not have a correlator matching the correlator on the present sales receipt. A preferred approach for dealing with this situation is for the retailer to maintain a database of this merchant's previously-generated correlators, and to include a comparison against values in this database prior to concluding that a non-match (Block 880 of FIG. 8B) is a potential theft. For example, if a shopper has an item with a correlator that does not match his receipt, perhaps this is a correlator generated by the retailer next door. In this case, the correlator will not be found in the current retailer's database, and will not be considered as a theft. On the other hand, if an item possessed by the shopper has a correlator that does not match his receipt but this item's correlator is found in the correlator database, then this is an item previously purchased from this merchant (and it is not a theft).

A fourth preferred embodiment, shown in FIGS. 9A and 9B, 10A and 10B, is similar to the third preferred embodiment, except that the correlator is not written to the sales receipt. Again, the correlator is unique, and is created for each sales transaction using input data shown generally at 900 of FIG. 9A. The correlator creating component is shown at 910, and as in the third preferred embodiment, this component may be embodied in the point-of-sale device (or in the RFID writer 920).

Figure 9A:
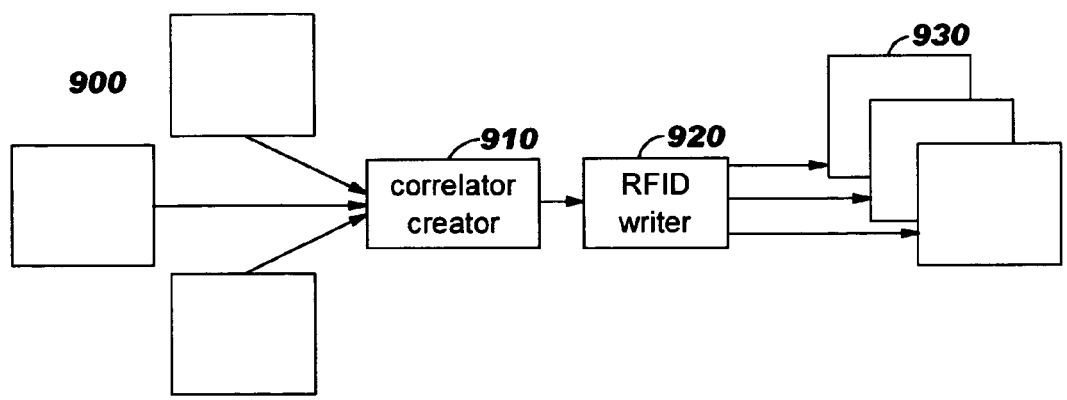
Figure 9B:
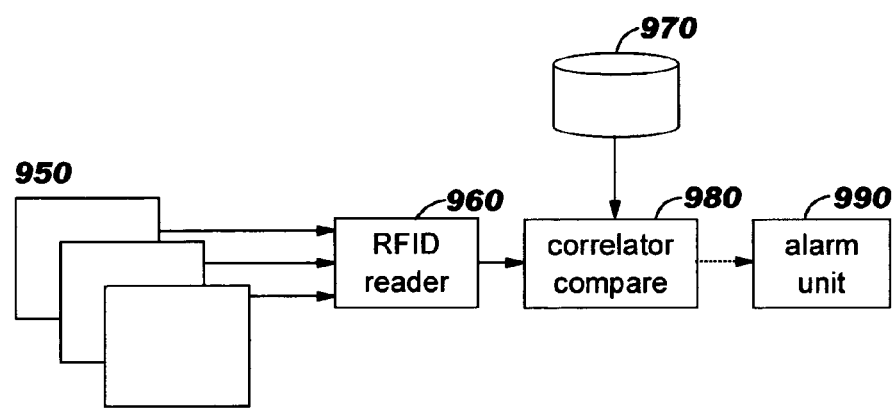
Figure 10A:
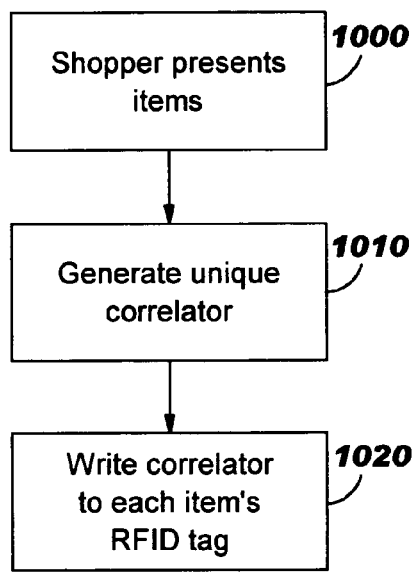
Figure 10B:
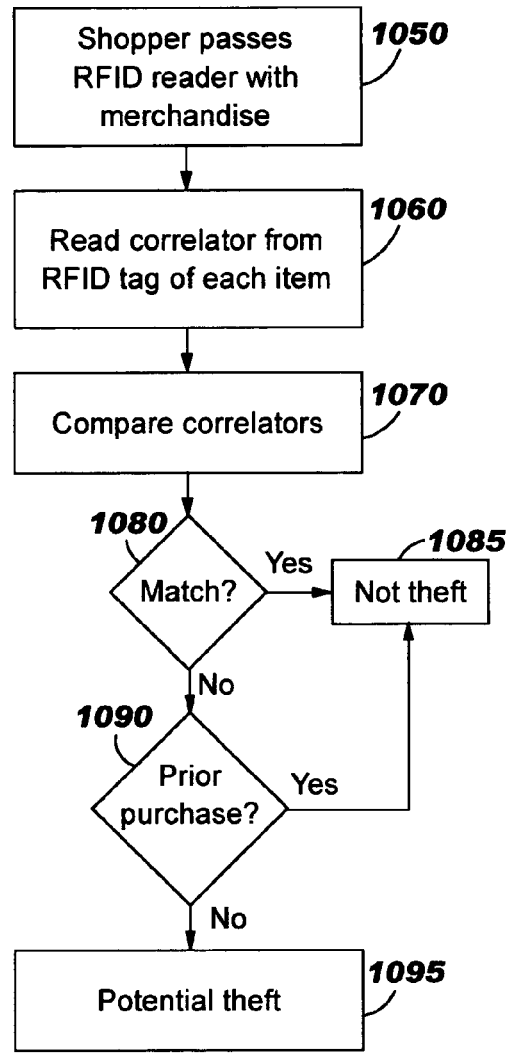

In this fourth preferred embodiment, when the shopper presents his items 930 for purchase (Block 1000), the correlator is generated (Block 1010) and written (Block 1020) by the RFID writer 920 into the RFID tag of each purchased item 930. When the shopper exits the premises, as depicted in FIGS. 9B and 10B, the merchandise 950 he is carrying passes an RFID reader 960 (Block 1050) which non-intrusively reads the correlators from the RFID tags (Block 1060). Now, however, a correlator comparing component 980 (which may be embodied within the RFID reader 960) makes a comparison (Block 1070) among the correlators of the various items. If the correlators all match each other (Block 1080), then this is not a theft (Block 1085). If any correlators are different, however, then a database 970 is preferably consulted to determine whether a non-matching correlator reflects a previous purchase (Block 1090). If so, then the shopper may have purchased this item from the retailer on an earlier date. For example, if the non-matching correlator is stored in the RFID tag of a clothing article which the shopper previously purchased from this retailer and is now wearing in the retailer's store, this is not a theft. However, if the RFID tag indicates that the item is from this retailer's inventory but no previous purchase of this item is recorded (including a current purchase which would have written a matching correlator in the item's RFID tag), then this is potentially an attempted theft (Block 1095) and the alarm unit 990 is preferably triggered.

In one aspect of this fourth embodiment, items that are in the shopper's possession upon entry to the retailer's premises and that have RFID tags on them are tracked. When the shopper exits the premises, the comparison among correlators (Block 1070) excludes those items which the shopper brought onto the premises. The items that are potentially stolen are then those items that (1) the shopper did not bring with him, and (2) have either no correlator or a correlator that does not match the other correlators.

Alternatively, if the items brought onto the premises by the shopper are not known, then the comparison among correlators (Block 1070) preferably excludes any items which can be determined (e.g., by consulting the database 970) to be previous purchases, as described above.

Figure 11A:
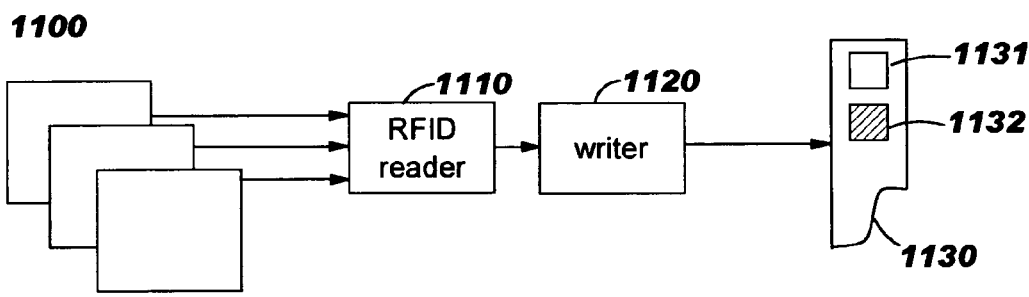
Figure 11B:
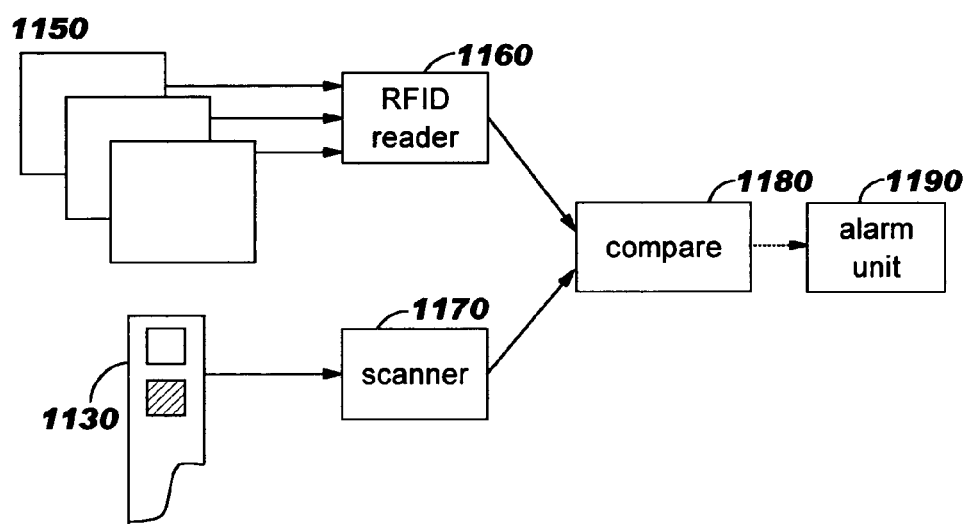
Figure 12A:
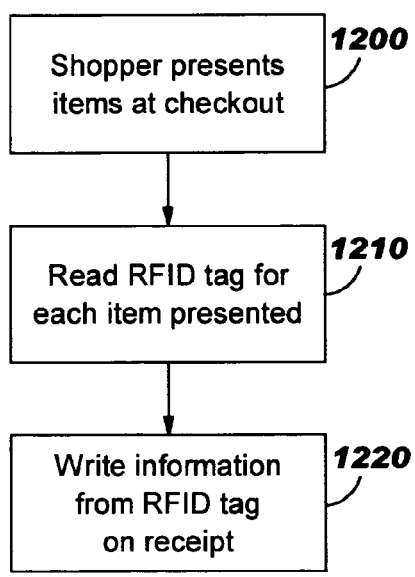
Figure 12B:
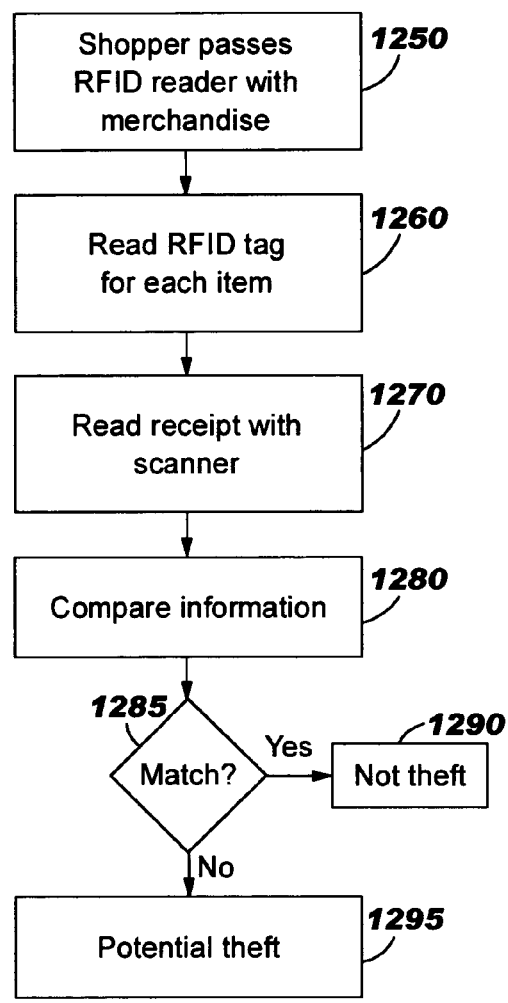

In a fifth preferred embodiment, which may be implemented using components shown generally in FIGS. 11A and 11B and logic as depicted in FIGS. 12A and 12B, information written on a receipt (not necessarily with an RFID tag) is used in detecting potential theft.

In this preferred embodiment, a shopper presents his selected items 1100 at the point of sale (Block 1200 of FIG. 12A). An RFID reader 1110 reads information from each item's RFID tag (Block 1210). Preferably, the EPC is read, although other information from the RFID tag may be used without deviating from the scope of the present invention. Thus, subsequent discussions of this fifth preferred embodiment refer to the EPC by way of illustration but not of limitation.

The EPC for each item is written in machine-readable form onto the receipt 1130 (Block 1220) by an appropriate writer component 1120. An RFID form may be used, in which case the writer component 1120 is an RFID writer that preferably writes onto the receipt using print-on-demand technology of the type described above. Or, a barcode, OCR, magnetic stripe, or other machine-readable format of the prior art may be used. One approach that may be used for writing the EPC to the receipt is to position the EPC information in a location 1132 separate from the conventional printed information 1131. When multiple items have been purchased, the EPC information is preferably encoded as an enumerated list (where each item's EPC may be distinguished from another with a special delimiter or by simply using a fixed-length representation in each case).

As the shopper exits the premises (referring now to FIGS. 11B and 12B), he passes an RFID reader 1160 (Block 1250) which non-intrusively reads the RFID tag from each item 1150 (Block 1260). The sales receipt 1130 is passed through an appropriate scanner 1170 (Block 1270). A comparison component 1180 then compares (Block 1280) the EPCs read by the RFID reader with the enumerated EPCs read from the receipt. If the EPCs all match (Block 1285), then this is not a theft (Block 1290). Otherwise, a potential theft is indicated (Block 1295), and an alarm unit 1190 may be triggered, etc.

As has been demonstrated, the present invention provides advantages over prior art theft detection techniques by leveraging RFID technology in novel ways. The techniques disclosed herein use relatively lightweight computations, and may therefore be carried out quite efficiently.

The present invention may also be used to thwart other types of theft. For example, assume that a customer who just purchased a collection of items and obtained a receipt leaves the store, only to return a few minutes later and select the same collection of items, hoping the prior receipt will enable him to leave the store without paying for the second collection of items. Embodiments of the present invention will detect the new collection of items as not having been purchased, since the items do not bear the customer's loyalty card number (in the second preferred embodiment, described with reference to FIGS. 5A and 5B), the items do not bear a correlator matching the correlator on the receipt (in the third embodiment, described with reference to FIGS. 7A and 7B), the items do not bear identical correlators (in the fourth preferred embodiment, described with reference to FIGS. 9A and 9B), or the items' unique EPC numbers are not enumerated on the receipt (in the fifth preferred embodiment, described with reference to FIGS. 11A and 11B).

It should be noted that while preferred embodiments of the present invention have been described with reference to use in a retail environment, the disclosed techniques may also be leveraged in other environments where it is desirable to detect concealment of items.

Embodiments of the present invention may also unobtrusively scan RFID-readable items on the customer's person when he/she enters the store, retain such information for the duration of the customer's shopping session, and account for it as the customer leaves the store, since it is understood that items carried onto the premises by the customer and then subsequently removed are not being stolen. The EPCs or other identifying data borne on such pre-purchased items can be deleted from the list of items scanned upon exit, so that their departure from the store will not signal a potential theft.

Embodiments of the present invention, including those described above, may analyze information stored in an RFID tag to distinguish whether items carried by the shopper are from the inventory of the retailer in whose store the shopper is presently located. In this manner, items purchased elsewhere (or at earlier times) will be omitted from the theft-detection operations performed as the shopper is exiting the retailer's premises. (For example, such items will be omitted from the checksum computation performed in the first preferred embodiment, the correlator comparison of the third and fourth preferred embodiments, and so forth.)

The disclosed techniques may be used advantageously in methods of doing business, for example by providing improved item checkout and sales receipt comparison services. As an example of how this may be provided, a service may be offered that (1) captures information at the point of sale, (2) performs theft detection at the exit from the premises, and (3) charges a fee. The fee might be charged uniformly for each transaction, or a fee might be assessed for each intercepted theft. In either case, the fee might be based on number of transactions performed, on the number of items in each transaction, or the total value of the transaction. Or, the fee might be assessed using as a subscription model whereby retailers pay a fixed fee for a periodic interval. In addition, an advantageous service may be provided with either the information capturing or the theft detection aspect, without the other, in cases where other means are available for that other aspect.

Commonly-assigned, co-pending U.S. patent application Ser. No. 09/790,104 (filed on Feb. 21, 2001; now U.S. Pat. No. 7,000,834), entitled "Method to Address Security and Privacy Issues of the Use of RFID Systems to Track Consumer Products", which was briefly discussed above, discloses techniques to prevent global tracking of people and the items they have purchased containing RFID tags, in addition to techniques for using RFID technology to prevent tampering of product information stored in RFID tags and to prevent pricing mistakes made at the point of sale. Commonly-assigned, co-pending U.S. patent application Ser. No. 09/847,889 (filed on May 3, 2001; now U.S. Pat. No. 7,076,441), entitled "Identification and Tracking of Persons Using RFID-Tagged Items", discloses techniques for using RFID technology to identify or characterize people, based on the RFID tags present in items being carried by that person at a point in time. If a prior-purchase database is provided with information about which person bought particular uniquely-identified items in the past, then the RFID tags may be used to locate information in the database that will identify the person currently carrying the items. Otherwise, the person can be characterized based upon the types of items he is currently carrying (as determined by reading the RFID tags of the items). Commonly-assigned, co-pending U.S. patent application Ser. No. 10/612,251 (filed on Jul. 2, 2003; now U.S. Pat. No. 6,992,574), entitled "Object Matching via RFID", discloses techniques for using RFID technology to track and match objects, when the RFID tags of these objects have been programmed with data suitable for indicating that the items are in association with one another. These commonly-assigned inventions are hereby incorporated herein by reference as if set forth fully.

As will be appreciated by one of skill in the art, embodiments of the present invention may be provided as methods, systems, or computer program products. Embodiments of the present invention may be provided using hardware, software, or a combination thereof. Furthermore, the present invention may take the form of a computer program product which is embodied on one or more computer-readable storage media (including, but not limited to, disk storage, CD-ROM, optical storage, and so forth) having computer-readable program code or instructions embodied therein.

The present invention has been described with reference to flowchart illustrations and/or block diagrams usable in methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions, which may be stored on one or more computer-readable media, may be provided to a processor of a general purpose computer, special purpose computer, embedded processor, or other programmable data processing apparatus to produce a machine, such that the instructions, which execute via the processor of the computer or other programmable data processing apparatus, create computer-readable program code means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While several preferred embodiments of the present invention have been described, additional embodiments as well as variations and modifications in the disclosed embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of preparing information usable in theft detection using radio frequency identification ("RFID") technology, comprising steps of:
   for a current transaction, reading a customer identifier from a customer loyalty card; and
   during the current transaction, storing the customer identifier in an item-identifying RFID tag affixed to each of at least one items being paid for by a shopper in the current transaction, such that the item-identifying RFID tag affixed to each of at least one items possessed by the shopper can subsequently be searched to determine whether the at least one possessed items were paid for in the current transaction.

2. The method according to claim 1, wherein the customer identifier is read with an RFID reader from a loyalty card RFID tag affixed to the customer loyalty card.

3. The method according to claim 1, further comprising the steps of:
   subsequently searching, for each of the at least one items possessed by the shopper, the item-identifying RFID tag affixed to the item to determine whether the customer identifier from the customer loyalty card was previously stored therein; and
   for any of the subsequently-searched item-identifying RFID tags for which the customer identifier is determined not to be previously stored therein, concluding that the item to which the item-identifying RFID tag is affixed was not paid for in the current transaction.

4. A method of detecting potential theft using radio frequency identification ("RFID") technology, comprising steps of:
   reading, from a customer loyalty card possessed by a shopper, a customer identifier;
   searching, for each of at least one items possessed by the shopper, an item-identifying RFID tag affixed to the item to determine whether the customer identifier from the customer loyalty card was previously stored therein during a particular purchase transaction; and
   concluding that one or more selected ones of the items possessed by the shopper were not paid for in the particular purchase transaction if the searching step fails to locate the customer identifier in the RFID tag affixed to the selected ones.

5. The method according to claim 4, wherein the customer identifier is read from a loyalty card RFID tag affixed to the customer loyalty card.

6. The method according to claim 4, further comprising the step of storing the customer identifier in the item-identifying RFID tag affixed to each of the items when the items are paid for during the particular purchase transaction, prior to operation of the searching step.

7. The method according to claim 4, further comprising the step of remembering each item that was in the shopper's possession when the shopper entered an establishment in which the particular purchase transaction was conducted, and wherein the searching and concluding steps omit the remembered items.

8. A system for preparing information usable in theft detection using radio frequency identification ("RFID") technology, comprising:
   means for reading, for a current transaction, a customer identifier from a customer loyalty card; and
   means for storing, during the current transaction, the customer identifier in an item-identifying RFID tag affixed to each of at least one items being paid for by a shopper in the current transaction, such that the item-identifying RFID tag affixed to each of at least one items possessed by the shopper can subsequently be searched to determine whether the at least one possessed items were paid for in the current transaction.

9. The system according to claim 8, wherein the customer identifier is read with an RFID reader from a loyalty card RFID tag affixed to the customer loyalty card.

10. The system according to claim 8, further comprising:
means for subsequently searching, for each of the at least one items possessed by the shopper, the item-identifying RFID tag affixed to the item to determine whether the customer identifier from the customer loyalty card was previously stored therein; and for any of the subsequently-searched item-identifying RFID tags for which the customer identifier is determined not to be previously stored therein, means for concluding that the item to which the item-identifying RFID tag is affixed was not paid for in the current transaction.

11. A system for detecting potential theft using radio frequency identification ("RFID") technology, comprising:
means for reading, from a customer loyalty card possessed by a shopper, a customer identifier;
means for searching, for each of at least one items possessed by the shopper, an item-identifying RFID tag affixed to the item to determine whether the customer identifier from the customer loyalty card was previously stored therein during a particular purchase transaction; and means for concluding that one or more selected ones of the items possessed by the shopper were not paid for in the particular purchase transaction if the means for searching fails to locate the customer identifier in the RFID tag affixed to the selected ones.

12. The system according to claim 11, wherein the customer identifier is read from a loyalty card RFID tag affixed to the customer loyalty card.

13. The system according to claim 11, further comprising means for storing the customer identifier in the item-identifying RFID tag affixed to each of the items when the items are paid for during the particular purchase transaction, prior to operation of the means for searching.

14. The system according to claim 11, further comprising means for remembering each item that was in the shopper's possession when the shopper entered an establishment in which the particular purchase transaction was conducted, and wherein the means for searching and means for concluding omit the remembered items.

* * * * *